United States Patent [19]

Veenhof

[11] 4,349,098

[45] Sep. 14, 1982

[54] CONVEYOR BELT CLEANING OR SCRAPING DEVICES

[76] Inventor: Willem D. Veenhof, R.R. 4, Hillview No. 1, Heath, Tex. 75087

[21] Appl. No.: 184,044

[22] Filed: Sep. 4, 1980

[30] Foreign Application Priority Data

Sep. 7, 1979 [ZA] South Africa .................... 79/4738

[51] Int. Cl.³ .............................................. B65G 45/00
[52] U.S. Cl. .................................... 198/497; 198/499
[58] Field of Search ..................... 198/499, 497, 493; 15/256.5

[56] References Cited

U.S. PATENT DOCUMENTS

| 2,227,776 | 1/1941 | Anderson | 198/497 |
| 2,303,211 | 11/1942 | Heetderks | 198/497 |
| 2,878,926 | 3/1959 | Harty | 198/497 |

FOREIGN PATENT DOCUMENTS 801144 7/1949 Fed. Rep. of Germany ...... 198/499

1575879 7/1969 France ................................ 198/499

Primary Examiner—John J. Love
Assistant Examiner—Brian Bond
Attorney, Agent, or Firm—Dennis T. Griggs

[57] ABSTRACT

A conveyor belt cleaning assembly (10) including at least one generally transversely extending cleaning member (20), engaging, in an operative position, a conveyor belt (14) surface to be cleaned. The cleaning member (20) is characterized in that over at least a short portion of its length, a lead-in surface is provided on its leading end (20A), such that it makes an acute angle with the belt. The belt cleaning member (20) is constructed of an abrasion resistant material and is flexible. In one embodiment, the flexible belt cleaning device (20) is resiliently biased in frictional engagement with the curved surface of the conveyor belt by a tension spring (30). In other embodiments, yieldable tension is developed by a counterweight (34) and alternatively, by a compression spring assembly (48).

10 Claims, 8 Drawing Figures

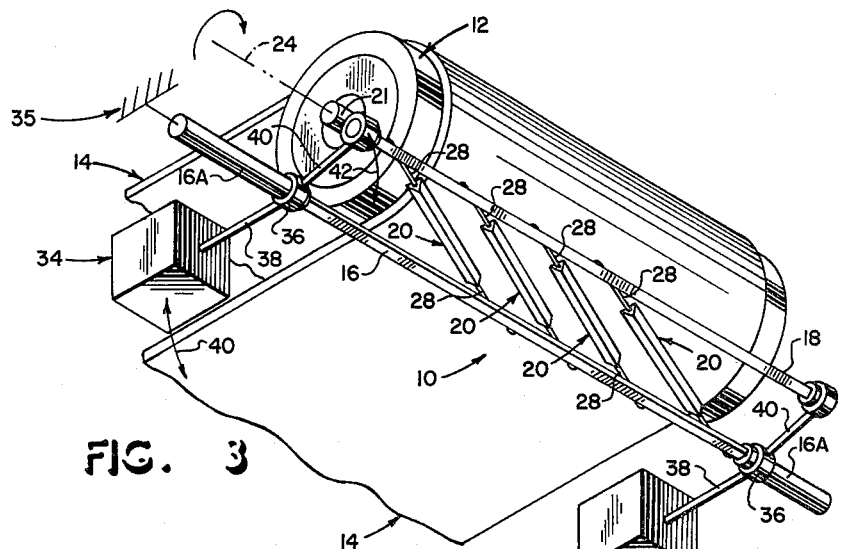
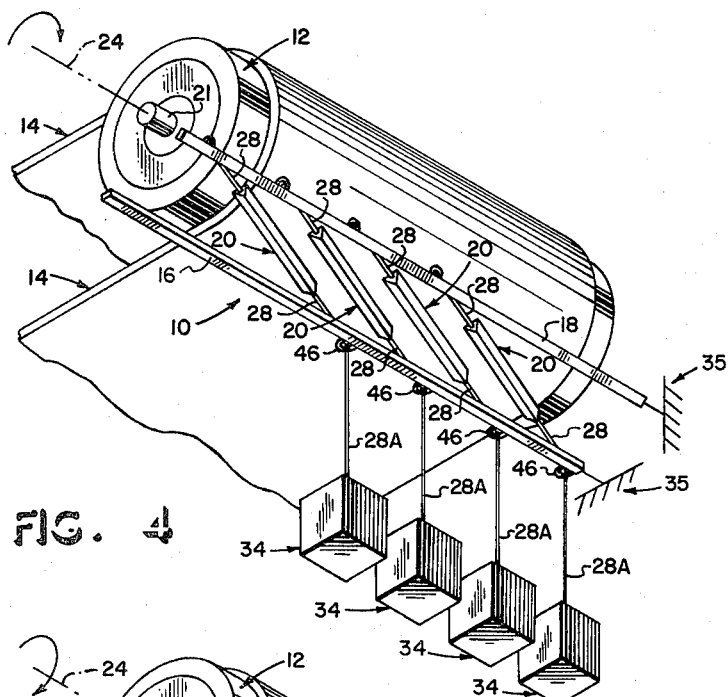
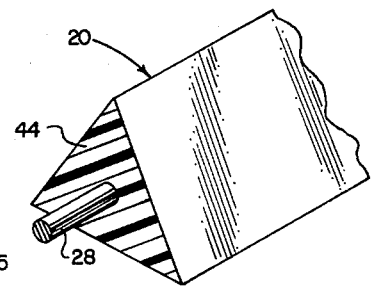
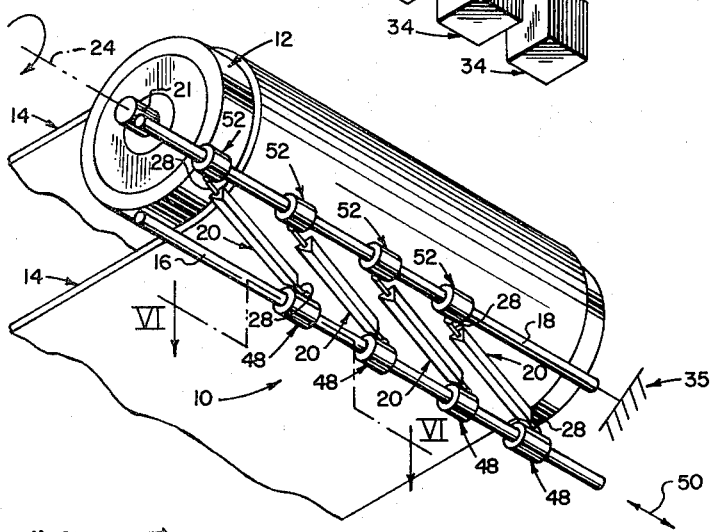
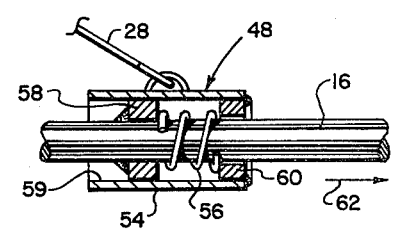
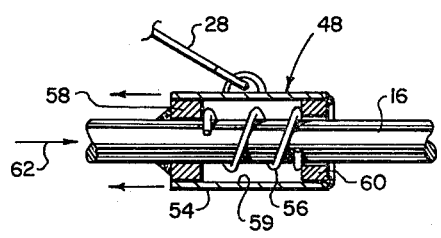

CONVEYOR BELT CLEANING OR SCRAPING DEVICES

This invention relates to conveyor belt cleaning or scraping devices utilized for removing material which adheres to a conveyor belt after it has passed around a head pulley drum or the like to deposit material carried by the conveyor.

Conveyor belt cleaning devices which are presently available generally include one or more blades disposed in planes transverse to the conveyor belt and which are urged towards the belt so as to cause engagement of an edge of a blade with the belt surface. Such a conveyor belt cleaning device is normally located rearwardly of the head pulley drum on the return path of the conveyor belt so that sufficient flexibility in the belt is provided to accept transverse movement thereof when, for example, damaged regions or fastening assemblies connecting ends of belt lengths pass the cleaning device.

Such a location of the belt cleaning device is disadvantageous from a number of different points of view. First, materials scraped from the belt surface by means of the belt cleaning device cannot, without additional expense, be discharged into a chute which is often provided at the head pulley drum end of the conveyor belt. Such chutes generally extend only partway beneath the head pulley drum. Added to this is the fact that in the desired cleaning zone, the belt tends to revert to an arched configuration soon after passing around the pulley drum so that it assumes the trough configuration which characterizes the upper load bearing path of the conveyor belt. Also, the scraper blades are generally located substantially at right angles across the width of the belt which means that they can become damaged when snagged by a fastening assembly or other material projecting from the belt.

It is the object of this invention to provide a conveyor belt cleaning device which, at least in some respect, overcomes or diminishes one or more of the above-mentioned disadvantages of present conveyor cleaning devices.

In accordance with one aspect of this invention, there is provided a conveyor belt cleaning device including at least one generally transversely extending cleaning member, engaging, in the operative position, a conveyor belt surface to be cleaned, the cleaning member being characterized in that over at least a short portion of its length, a lead-in surface is provided on the leading end of the conveyor belt cleaning member, said lead-in surface making an acute angle with the belt.

In accordance with another aspect of this invention there is provided a conveyor belt cleaning device comprising at least one cleaning member extending transversely relative to the belt but in a generally helical direction relative to a head pulley drum of the conveyor belt assembly, the conveyor belt cleaning member being resiliently movable in a direction away from the belt surface in a region where the belt is in contact with the head pulley drum.

Further features of the invention provide for the conveyor belt cleaning member to be located beneath the overhang defined by the head pulley drum, for there to be a plurality of conveyor belt cleaning members extending in similar paths relative to a conveyor belt such that each follows the path of a multistart thread of extremely large pitch, for each of the conveyor belt cleaning members to be composed of a series of abrasion resistant elements threaded onto a flexible wire or cable held in tension by means of at least one spring positioned at one end thereof, and preferably the trailing end, and for the elements to be of a substantially triangular shape in cross section.

Although the foregoing features are preferably included in the same conveyor belt cleaning device, this is not essential to successful practice of all aspects of the invention.

Thus, for example, an otherwise conventional conveyor belt cleaning blade can be provided with additional portions defining lead-in surfaces which are capable of cooperating with belt fasteners or the like to lift a scraper blade away from the belt surface as the fasteners approach the scraper blade.

In order that the invention may be more fully understood, multiple embodiments thereof will now be described with reference to the accompanying drawings in which:

FIG. 3 is a perspective underneath view of a second form of conveyor belt cleaning device in operation;

FIG. 4 is a perspective underneath view of a third form of conveyor belt cleaning device in operation;

FIG. 5 is a perspective underneath view of a fourth form of conveyor belt cleaning device in operation;

FIG. 6 is a sectional view taken along the line VI—VI of FIG. 5, illustrating a compression spring assembly;

FIG. 7 is a view similar to FIG. 6 showing the spring assembly in compression; and FIG. 8 is a perspective view, partially cut away, of a second form of a flexible cleaning member.

Figure 1:
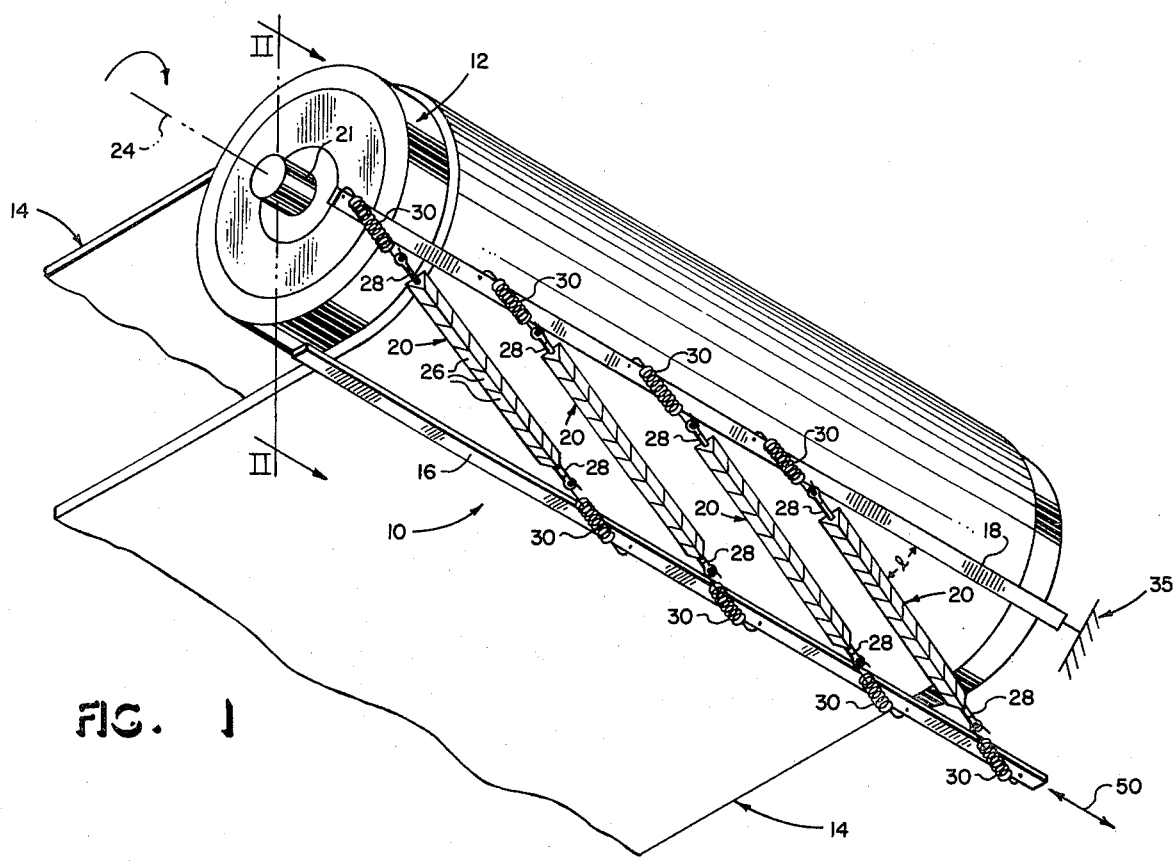
FIG. 1 is a perspective underneath view of a head pully drum of a conveyor belt assembly, illustrating one form of conveyor belt cleaning device in operation.
Figure 2:
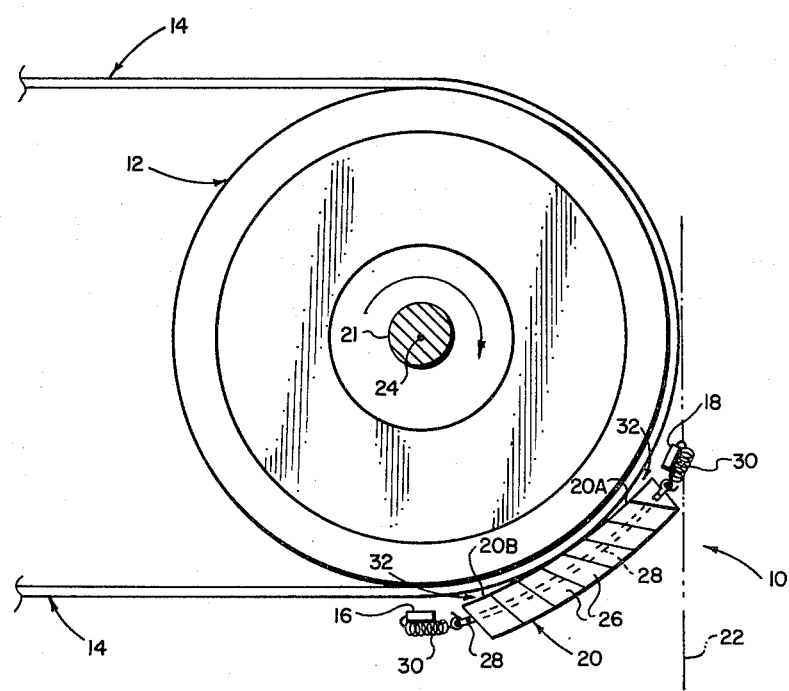
FIG. 2 is a side elevation of the same conveyor belt cleaning device.

Referring now to FIGS. 1 and 2 of the accompanying drawings, a conveyor belt cleaning assembly generally indicated by the numeral 10, is located beneath the overhang of a head pully drum 12 supporting a conveyor belt 14 passing therearound. The conveyor belt 14 is an endless flexible belt, operating over drive, tail-end and bend terminals, and over belt idlers or a slider bed. The conveyor belt 14 is suitable for handling many materials and a wide range of particle sizes over long distances, up and down slopes.

For simplicity of illustration, the supporting framework and structure have been omitted from the accompanying sketches so that no support means are illustrated for two parallel transversely extending bars 16 and 18 which form the main supports for the belt cleaning members 20. It will be understood that the head pulley drum 12 is mounted on a shaft 21 which is supported at opposite ends for rotation on bearings in the usual manner.

The uppermost transverse bar 18 is located, as shown clearly by the dashed line 22 in FIG. 2, inwardly of the overhang portion of the head pulley drum so that conveyed material, in particular lumps thereof, will not become wedged between the belt surface and the bar 18.

The other support bar 16 is located substantially beneath the axis 24 of rotation of the head pulley drum 12 and a small distance away from the belt surface itself.

Thus the line between the two support bars intersects the arcuate surface of the conveyor belt 14 and thus a flexible conveyor belt cleaning member is required. In order to provide such a flexible conveyor belt cleaning member there is provided an articulated, flexible cleaning member 20 composed of a series of elements 26 of a wear resistant material such as ceramic or tungsten carbide threaded onto a high strength, stainless steel wire or cable 28. The flexible cleaning member includes at least one tension spring 30 connected in its length, preferably two springs 30 at opposite ends as illustrated.

The elements 26 are each of a triangular shape having a circular bore through which the stainless steel cable 28 is threaded. Alternatively, if it is required that the triangular elements be non-rotatable, the bore through the elements can be of polygonal shape in cross-section to cooperate with a complementarily shaped cross-sectioned cable 28. This latter arrangement would ensure that the elements do not rotate randomly when struck by a belt fastener or other projection on a conveyor belt.

The elements 26 may also assume the form of links of a chain, which provides both flexibility and durability. In the chain link embodiment, the links are preferably formed of tungsten carbide steel, or are otherwise hardened for rough service. The cable 28 may be threaded through the links, or secured to each end of the chain.

Any suitable number of conveyor belt cleaning members 20 as just described may be provided to extend across the entire width of a conveyor belt. In this particular embodiment of the invention, there are illustrated four such members, but is must be realized that one, two, three, five or more such members, as desired, may be utilized to good advantage.

In the illustrated embodiment of the invention each of the conveyor belt cleaning members 20 has one end of the cable 28 secured to the upper transverse support bar 18. The cleaning member 20 is held in contact with the belt surface by the spring 30 and cable 28 which is anchored, at its other end, to the lower transverse support bar 16 at a position laterally spaced relative to the point of attachment to the upper support bar 18. Thus each of the conveyor belt cleaning members 20 will follow a substantially helical path and the four members will thus follow four different paths akin to four starts of a multistart thread of great pitch.

As shown most clearly in FIG. 2, the leading end 20A and trailing ends 20B of each of the conveyor belt cleaning members 20 are each maintained at a small distance from the surface of the conveyor belt. This is shown clearly by numeral 32 in FIG. 2. The spacing of these end regions from the belt surface, whilst the remainder of the length of the conveyor belt cleaning member 20 is in contact with the surface of the conveyor belt 14, is to provide a lead-in clearance for any protruberances or the like carried on the belt surface, and in particular, to provide lead-in clearance for mechanical fasteners as rivets or bolts, and thereby avoid snagging or binding as the conveyor belt 14 is advanced or reversed. It will be observed that the inwardly facing surface of each end 20A, 20B defines an acute angle with the belt 14.

It will be understood that as a result of the flexible nature of the stainless steel cable 28, each of the above-described conveyor belt cleaning members 20 will be held in yieldable thrusting engagement with the surface of the conveyor belt apart from its leading end region. The four conveyor belt cleaning members 20 illustrated in this particular embodiment of the invention are arranged such that they overlap in their operative positions and thereby clean the entire width of the conveyor belt apart, possibly, from the absolute edge regions thereof.

It will be understood that the shape and design of the elements 26 and of the conveyor belt cleaning members 20 themselves may be varied extremely widely and the above-described construction is not intended to be limiting on the scope of this invention. Also, the angle alpha ($\alpha$) (see FIG. 1) made between a conveyor belt cleaning member 20 and the transverse support member 18 will be varied according to the materials to be cleaned off the belt as well as to the physical characteristics of the belt and the cleaning member.

Turning now to FIG. 3, a first alternative form of the invention is illustrated wherein the flexible belt cleaning members 20 are maintained in thrusting engagement with the curved surface of the conveyor belt 14 by means of counterweights 34. The lowermost support bar 16 is fixed rigidly in place (as indicated by the anchor symbols 35) and serves as a pivotal bearing member for a cylindrical collar 36 which is received around an outwardly projecting cylindrical shaft portion 16A. Bars 38, 40 interconnect the counterweight 34, the bearing collar 36 and the movable support bar 18. Under the influence of gravity, the counterweights 34 are urged downwardly in the direction of the arrows 40, thereby driving the upper support bar 18 in counterclockwise turning movement with respect to the axis 24 as indicated by the arrow 42.

In the arrangement illustrated in FIG. 3, the springs 30 are not included, with the end cables 28 of the flexible cleaning members 20 being secured at each end to the lower and upper support bars 16,18, respectively. The overall length of each flexible cleaning member 20, including the length of the wire or cable 28, is carefully selected to incorporate a measure of slack whereby the flexible cleaning member 20 will be urged into thrusting engagement around the curved surface of the conveyor belt 14, with the exception of the lead-in surface regions 20A, 20B as previously discussed. It should be understood, however, that spring members 30 may be combined therewith and used to good advantage in certain cleaning applications, if desired.

The flexible cleaning member 20 illustrated in FIG. 3 is a continuous length 44 of a wear resistant material such as high density polyurethane or a synthetic or natural rubber material, for example, as illustrated in FIG. 8. For some applications, the flexible cleaning member 20 may preferably be an articulated combination of polygonal blocks or other discrete elements, as previously discussed, of the high density polyurethane plastic or rubber material or other wear resistant material.

The object of the counterweight arrangement shown in FIG. 3 is to apply continuous but yieldable tension in the flexible cleaning members 20 as the cleaning action is carried out. Thus, in operation, the counterweights 34 and the movable support bar 18 undergo slight turning movements, both clockwise and counterclockwise, as reaction forces are imparted to the movable support bar 18 in response to the rubbing action of the flexible cleaning elements 20 against the moving conveyor belt 14.

A third form of the conveyor belt cleaning assembly 10 is illustrated in FIG. 4. In this arrangement, both the lower and upper support bars 16, 18 are rigidly secured beneath the overhang of the head pulley drum 12. The flexible belt cleaning members 20 are disposed in parallel relation to one another and transversely disposed with respect to the line of movement of the conveyor belt 14 as previously discussed. Additionally, the cleaning members 20 are spaced with respect to each other to provide overlapping cleaning action over a substantial portion of the conveyor belt 14. The upper end of each flexible wire or cable 28 is securely fastened to the upper support bar 18, with the lower end of each wire or cable 28 being extended through a guide 46 mounted on the lower support bar 16. The lowermost extension of the cable 28 is identified by the reference numeral 28A. The cable extension 28A is connected at its lower end to a counterweight 34.

In this arrangement, the cable extension section 28A slips freely through the guide 46, whereby a constant, yieldable tension load is applied to the flexible conveyor belt cleaning assembly 20. Each counterweight 34 will undergo slight vertical movement, both upwardly and downwardly, in response to reaction forces developed as each flexible cleaning assembly 20 rubs against the moving conveyor belt 14. According to this arrangement, each flexible cleaning member 20 is maintained in yieldable, thrusting engagement with the curved surface of the conveyor belt 14, thereby assuring positive scraping or cleaning action.

It will be appreciated that an important feature of the foregoing arrangement is that yieldable tension is developed in the flexible cleaning members 20 without the use of springs. This tension force, which holds each cleaning member in scraping or rubbing contact with the moving conveyor belt 14, will also be produced if springs 30 are included in the flexible cleaner assembly 20 as previously discussed. The addition of springs 30 in combination with the counterweight arrangement shown in FIG. 4 will alter the deflection characteristics of the system, making it slightly more yieldable.

A fourth form of a conveyor belt cleaning assembly 10 is shown in FIG. 5 in which yieldable tension in the flexible cleaning member 20 is developed by a compression spring assembly 48. In this arrangement, the uppermost support bar 18 is securely anchored in place, with the lowermost support bar 16 being movable laterally as indicated by the arrow 50.

The flexible conveyor belt cleaning members 20 are secured between the lower and upper support bars 16, 18, with the uppermost connecting cable 28 being securely fastened to a collar 52, and the lowermost portion of the flexible connecting cable 28 being securely fastened to the compression spring assembly housing 54 (FIG. 6).

Referring now to FIGS. 6 and 7, a compression spring 56 is received around the lower support bar 16 and is confined within the housing 54 between an anchor block 58, which is welded to the support bar 16, and a slip block 60, which is welded to the inside diameter of the housing 54. As can best be seen in FIG. 7, the housing 54 is movable relative to the anchor block 58 and support bar 16 whereby the spring 56 undergoes compression as the lower support bar 16 is moved to the right as indicated by the arrows 62. The anchor block 58 is displaced through the bore 59 of the housing 54. The restoring force of the compression spring 56 is transmitted through the slip block 60 and housing 48 to develop a yieldable tension force in the connecting cable 28.

It will be appreciated by one skilled in the art that the mounting positions of the compression spring assemblies 48 and coupling collars 52 could be reversed with the compression spring assemblies being mounted on the upper, fixed support bar 18, and the coupling collars 52 being mounted on the lower, movable support bar 16. Moreover, it will be appreciated that compression spring assemblies 48 could be mounted at each end of each flexible cleaning assembly 20, if desired.

Although preferred embodiments of the invention have been described in detail, it should be understood that various changes, substitutions and alterations can be made therein without departing from the spirit and scope of the invention as defined by the appended claims.

What is claimed is:

1. A conveyor belt cleaning assembly for cleaning a conveyor belt in a region where the conveyor belt is in contact with the curved surface of a pulley drum comprising, in combination:

first and second support bars adapted to be mounted in an operative position in the contact region, said first and second support bars extending generally in alignment with the axis of rotation of the pulley drum and being spaced apart in the operative position;

at least one elongated, flexible scraping member supported between the first and second support bars for engagement with the curved surface of the conveyor belt in the operative position, said elongated scraping member extending in a generally helical direction relative to the pulley drum when engaged with the conveyor belt in the operative position; and, bias means coupled to said scraping member for maintaining said scraping member in yieldable, thrusting engagement with the curved surface of the conveyor belt in the operative position.

2. The conveyor belt cleaning assembly as defined in claim 1, said bias means comprising a spring coupled between said flexible scraping member and one of said support bars.

3. The conveyor belt cleaning assembly as defined in claim 2, at least one of the upper and lower support bars being transversely movable relative to the other, and wherein said spring is a tension spring connected between one of said support bars and an end portion of said flexible scraping member wherein lateral movement of the movable support bar causes extension of the tension spring thereby developing tension in the flexible scraping member.

4. The conveyor belt cleaning assembly as defined in claim 2, at least one of said first and second support bars being transversely movable relative to the other, and wherein said spring is a compression spring mechanically coupled between the flexible scraping member and one of the support bars, wherein lateral movement of the movable support bar causes compression of the compression spring, thereby developing tension in the flexible scraping member.

5. A conveyor belt cleaning assembly as defined in claim 1, wherein one of said support bars is fixed in place, and the other support bar being mounted for pivotal movement relative to the fixed support bar, and said bias means comprising a counterweight coupled to the movable support bar for biasing it for turning movement toward the pulley drum, wherein the flexible scraper member is biased into yieldable engagement with the curved surface of the conveyor belt in the operative position.

6. The conveyor belt cleaning assembly as defined in claim 1, wherein said support bars are spaced in elevation, and one end of the flexible cleaning member is secured to the upper support bar and the other end of the flexible cleaning member including a flexible wire or cable guided by the lower support bar, and said bias means including a counterweight secured to the lower end of the wire or cable for biasing the flexible cleaning member into yieldable engagement with the curved surface of the conveyor belt in the operative position.

7. The conveyor belt cleaning assembly as defined in claim 1, said elongated, flexible scraping member comprising a flexible wire or cable and a plurality of wear-resistant scraper elements threaded onto said wire or cable.

8. The conveyor belt cleaning assembly as defined in claim 1, said flexible cleaning member comprising a flexible wire or cable and a continuous length of wear-resistant, flexible material threaded onto said flexible wire or cable.

9. The conveyor belt cleaning assembly as defined in either claim 7 or 8, said wear-resistant scraper elements and said continuous length of wear-resistant flexible material each having a polygonal cross-section.

10. A conveyor belt cleaning assembly for cleaning a conveyor belt in a region where the conveyor belt is in contact with the curved surface of a pulley drum comprising, in combination:

first and second support bars adapted to be mounted in an operative position in the contact region, said first and second support bars extending generally in alignment with the axis of rotation of the pulley drum and being spaced apart in the operative position;

an array of elongated, flexible scraping members supported between the first and second support bars for engagement with the curved surface of the conveyor belt in the operative position, each scraping member extending in a generally helical direction relative to the pulley drum when engaged with the conveyor belt in the operative position, the engagement of each scraping member with said conveyor belt defining a scraping course, the lateral span of each scraping course being less than the width of the conveyor belt to which the scraping members are applied, said elongated scraping members being laterally spaced whereby the scraping courses defined by adjacent scraping members overlap; and, resilient means coupled to said scraping members for maintaining said scraping members in yieldable, thrusting engagement with the curved surface of the conveyor belt in the contact region.

* * * * *